United States Patent [19]

Ernst et al.

[11] 4,158,394
[45] Jun. 19, 1979

[54] MECHANISM FOR LUBRICATING THE BEARINGS OF THE CUTTING ROLLERS OF A ROLLER BIT

[75] Inventors: Horst M. Ernst, Eltingshausen; Armin Olschewski; Lothar Walter, both of Schweinfurt; Manfred Brandenstein, Aschfeld, all of Fed. Rep. of Germany

[73] Assignee: SKF Kugellagerfabriken GmbH, Schweinfurt, Fed. Rep. of Germany

[21] Appl. No.: 878,155

[22] Filed: Feb. 15, 1978

[30] Foreign Application Priority Data

Feb. 15, 1977 [DE] Fed. Rep. of Germany ....... 2706290

[51] Int. Cl.² ........................ E21B 9/18; F16C 19/00
[52] U.S. Cl. .................................. 175/228; 175/337; 308/8.2
[58] Field of Search .................. 308/8.2, 76, 77, 78; 175/228, 229, 227, 337, 339

[56] References Cited

U.S. PATENT DOCUMENTS

| | | | |
|---|---|---|---|
| 2,831,660 | 4/1958 | Smiecinski | 175/228 |
| 2,880,970 | 4/1959 | Swart | 175/337 |
| 3,017,937 | 1/1962 | Bobo | 175/228 |
| 3,235,316 | 2/1966 | Whanger | 308/8.2 |
| 3,952,815 | 4/1976 | Dysart | 175/337 |

*Primary Examiner*—Charles E. Frankfort
*Attorney, Agent, or Firm*—Eugene E. Renz, Jr.

[57] ABSTRACT

A system for lubricating bearings in a drilling apparatus including a roller bit with at least one pivot and a cutting roller rotatably supported on the pivot by bearings. A cavity or chamber is formed in the roller bit for a non-compressible flushing liquid. The flow channel which communicates with the chamber at one end and the bearing cavity at the other end, provides a flow path for the flushing liquid to the bearing cavity. In one form the flushing liquid discharges to the bearing cavity at a point remote from an annular gap between the outer axial end face of the cutting roller and the roller bit. In another embodiment circumferentially spaced discharge ports are located between the bearings so that a portion of the flushing liquid is discharged to the environment and the remainder flows through the bearings and out the annular gap.

4 Claims, 2 Drawing Figures

MECHANISM FOR LUBRICATING THE BEARINGS OF THE CUTTING ROLLERS OF A ROLLER BIT

BACKGROUND OF THE INVENTION

The present invention relates to apparatus and system for lubricating the bearings of cutting rollers supported on the pivots of a roller bit. In this system and apparatus the roller bit has an inner cavity or chamber filled with a noncompressible flushing liquid under a feed pressure and means for circulating the flushing liquid through the bearings.

Lubricating the bearings in apparatus of this type by noncompressible lubricant is not new per se. A typical prior art lubricating system is illustrated in French Pat. No. 1,466,378. This system, however, has some drawbacks and shortcomings. For example, in order to prevent the flushing liquid mixed with the drilling mud from entering from the outside environment into the bearing cavity and causing detrimental wear, a gasket or seal must be provided on the side of the bearing cavity facing the roller bit. In drilling operations, the drilling apparatus is subjected to heavy shock loads resulting in quick wear and deterioration of the gasket or seal rendering it inoperative or useless after a relatively short operating period. Failure of the gasket or seal allows flushing liquid to pass through the bearings of the cutting roller and the deposits carried along with the flushing liquid such as the wear causing drilling mud enter the bearing. This produces premature bearing wear and failure. Additionally it has been found that with this prior system, special lubricant reservoirs must be provided which greatly increase the manufacturing cost of the roller bit. This also results in a comparatively expensive maintenance program, warehousing of the special lubricants and regular replenishment of the lubricant reservoir. Moreover, the known systems described above have the further disadvantage that the friction heat is removed only by the flushing liquid around the outside of the cutting rollers through the wall of the cutting roller so that detrimental overheating and corresponding damage to the bearings during operation often result.

It is an object of the present invention to provide an improved system and apparatus for lubricating bearings of the cutting rollers characterized by novel features of construction and arrangement which eliminates the need for packing the roller bit with lubricant as well as eliminating means for sealing the bearing cavity from the outside. It is also an object to provide a lubricating system and apparatus which is easy and economical to manufacture and provides a long service life of the cutting rollers by reducing the heat generated during operation and thereby eliminating premature bearing wear and friction.

SUMMARY OF THE INVENTION

The present invention provides a lubricating system and apparatus which eliminates the shortcomings and drawbacks of the prior systems disclosed above in the provision of at least one flow channel in the roller bit connecting the inner chamber or cavity thereof and the bearings and that each cutting roller includes an opening for releasing the flushing liquid to the environment surrounding the roller bit after passage through one or more of the bearings. By this arrangement when the flushing liquid flows through the bearings, it entrains any foreign materials present in the bearings such as abrasion residue from the bearing surfaces or drilling mud. In this manner deposit of these harmful substances on the bearing surfaces is eliminated. By this system the bearings are simultaneously lubricated and cooled on a continuous basis by the flushing liquid which continuously circulates through the bearings during operation of the drilling apparatus. In accordance with one embodiment of the invention the discharge flow port is formed integrally in the wall of the cutting roller. In accordance with another embodiment or feature of the invention, the discharge port for the flushing liquid is formed by an annular gap between the face of the cutting roller and the opposing, confronting closely spaced outer surface of the roller bit.

BRIEF DESCRIPTION OF THE DRAWINGS

These and other objects and the various features and details of the operation and construction of a lubricating system in accordance with the present invention are hereinafter more fully set forth with reference to the accompanying drawings, wherein.

DETAILED DESCRIPTION OF THE PREFERRED EMBODIMENTS

Figure 1:
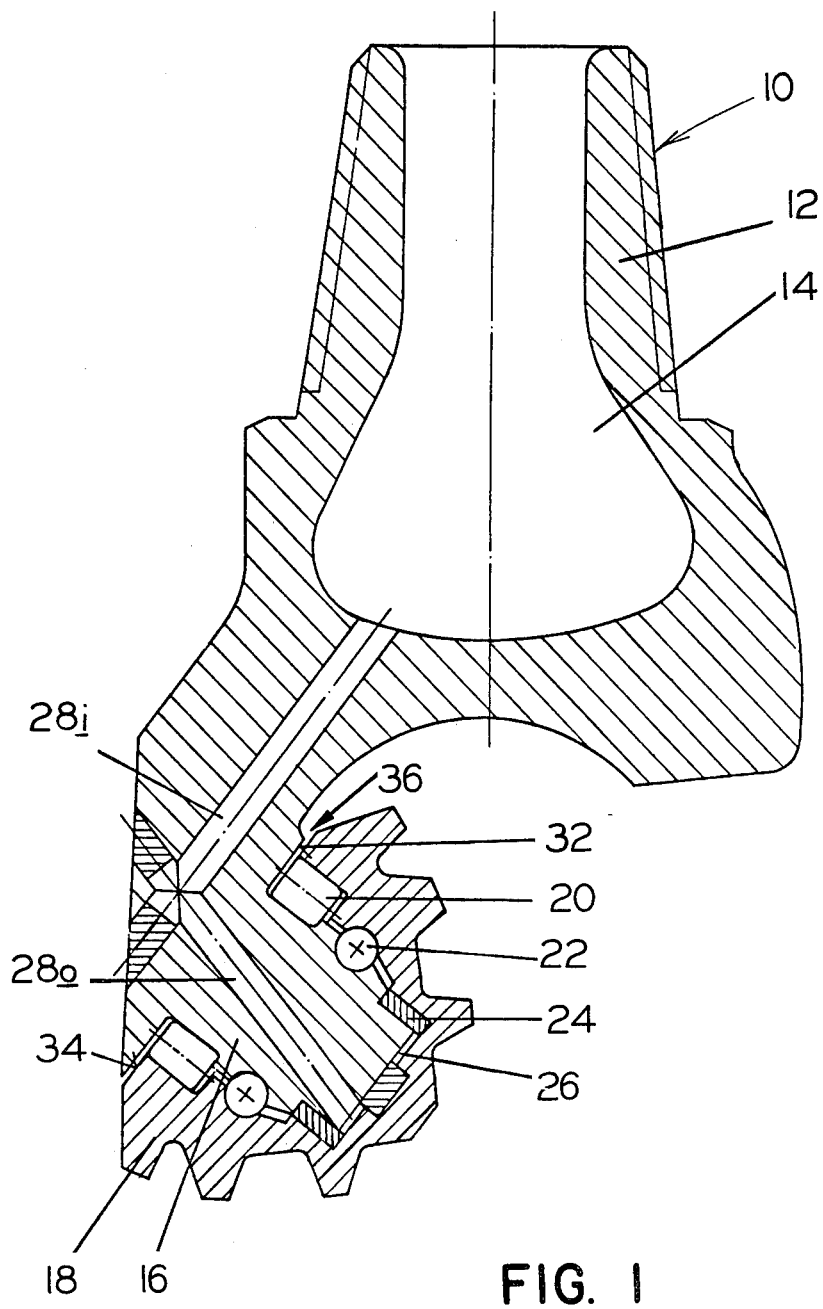
FIG. 1 is a longitudinal section of a roller bit incorporating a lubricating system and apparatus in accordance with the present invention.

Referring now to the drawings and particularly to FIG. 1 thereof, there is illustrated a drilling head assembly incorporating a lubricant system in accordance with the present invention. The drilling head generally designated by the numeral 10 includes a roller bit, 12, having an axially oriented cavity or chamber 14 filled with a noncompressible flushing liquid. As is conventional, the roller bit 12 has a plurality of pivots 16 which rotatably support cutting rollers 18 on at least one bearing. In the present instance, the confronting surfaces of the pivot and cutting roller are provided with complementary raceways for a series of bearings including an outer rolling bearing, 20, a middle ball bearing 22 and an inner friction bearing 24.

In accordance with the present invention, the flushing liquid chamber 14 is connected with the bearing cavity 26 between the pivot of the roller bit and the cutting roller via an internal feeding channel 28 comprising a first leg 28i in the roller bit and a second leg 28o in the pivot 16 running generally axially thereof. Note the flow channels may be formed in this manner by a conventional cross drilling operation wherein the legs adjacent the outer periphery of the roller bit are plugged to provide communication between the chamber 14 and the bearing cavity 26. As illustrated the outer axial end face 32 of the cutting roller confronts and is spaced from a planar circumferentially extending face 34 of the roller bit 12 defined by an outwardly directed shoulder at the juncture of the roller bit 12 and pivot 16 providing an annular gap 36 to facilitate flow of the flushing liquid through the bearings as described in more detail below.

Consider now the operation of a drilling head in accordance with the present invention. During operation, the non-compressible flushing liquid which is under a steady feed pressure flows from the chamber 14 into the bearing cavity 26 via the connecting channels 28*i* and 28*o*. From the bearing cavity 26, the flushing liquid flows, in the present instance, continuously through the friction bearing 24, the ball bearing 22 and roller bearing 20 and from there through the annular gap 36 to the environment surrounding the drilling head. By reason of continuous flow of flushing liquid through the bearings, the bearings are continuously flushed so that no detrimental grinding abrasion residue can settle on the bearing surfaces. This circulation of flushing liquid also continuously lubricates and cools the bearings.

Figure 2:
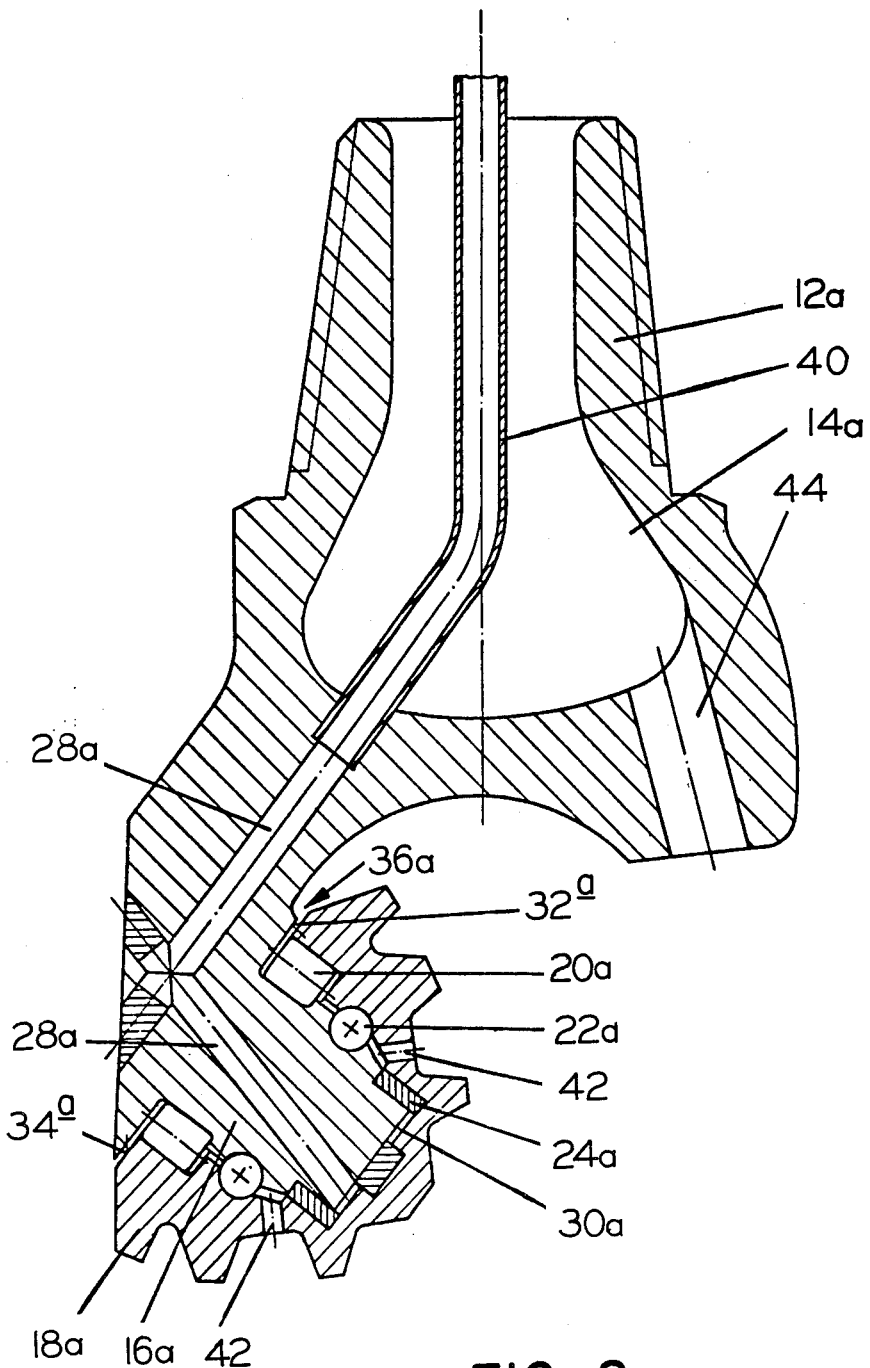
FIG. 2 is a longitudinal section of a roller bit similar to FIG. 1 showing a modified version of the lubricating system and apparatus of the present invention.

There is illustrated in FIG. 2 a modified embodiment of the lubricating system and apparatus of the present invention. The details and arrangement of the drilling head are generally the same as described in the embodiment above and thus carry the same numeral with a letter designation. Thus the drilling head assembly includes a roller bit 12*a* having a chamber 14*a* for a flushing liquid, a plurality of pivots 16*a* each of which mounts a cutting roller 18*a* on a series of three bearing assemblies, 20*a*, 22*a* and 24*a*. The roller bit further includes an internal flow channel 28*a* for delivering the flushing liquid to the bearing cavity 30*a*. This internal flow channel is similar to the previously described channel in that it is formed in the roller bit by a cross drilling operation.

In accordance with the present embodiment, a feed tube 40 connected to a flushing liquid source having means for supplying it under a feed pressure connects at its inner end to the flow channel 28*a* thereby to deliver the flushing liquid to the bearing cavity in the manner described in more detail below. In the present instance a series of circumferentially spaced fluid discharge ports 42 are provided adjacent the tip of the cutting roller 18*a* and communicate with the environment surrounding the cutting roller 18*a* at their outer ends and the bearing cavity 30*a* between the ball bearings 22*a* and the friction bearing 24*a*.

Considering now the operation, a flushing liquid is delivered under pressure via the feed tube 40 into the flow channel 28*a* and from there into the bearing cavity 30*a* adjacent the tip of the cutting roller. From there the flushing liquid flows through the friction bearing 24*a* and is in part released to the environment surrounding the cutting roller via the discharge ports 42. A residue of the flushing liquid flows through the ball bearing 22*a* and roller bearing 20*a* and is discharged to the environment through the annular gap 36*a* adjacent the outer axial end of the cutting roller defined by the confronting, spaced outer axial end face 32*a* of the cutting roller and the opposing face 34*a* of the roller bit. The accelerating effect of the outer axial end face of the cutting roller which rotates relative to the roller bit creates a means for conveying the flushing liquid to the environment surrounding the cutting roller. Further the environment of the roller bit may be additionally supplied with flushing liquid from the chamber 14*a* via the bore hole 44.

In summary therefore the system and apparatus of the present invention provide a relatively simple and economic means for lubricating bearings of a drilling head assembly. The arrangement has the advantage that no lubricant packing is needed and that the bearing cavity for these bearings need not be sealed from the environment surrounding the cutting roller. As described above the process effectively lubricates and cools the bearings by continuous flow of the flushing liquid therethrough in a predetermined controlled path.

While particular embodiments of the present invention have been illustrated and described herein, it is not intended to limit the invention and changes and modifications may be made therein within the scope of the following claims.

We claim:

1. In a drilling apparatus including a roller bit having an inner chamber filled with a non-compressible flushing liquid, at least one pivot and a cutting roller having a tip supported for rotation on said pivot by at least one bearing assembly, an annular gap between the outer axial end face of the cutting roller and an opposing confronting face of the roller bit spaced from said cutting roller end face, a system for lubricating the bearing assembly comprising at least one channel in the roller bit connecting the fluid chamber and said bearing assembly and at least one discharge opening in the wall of the cutting roller between said gap and tip permitting discharge of the flushing liquid to the environment around the cutting roller after passage through said bearing assembly.

2. A drilling apparatus as claimed in claim 1 wherein said flushing liquid is delivered through a tubular member in said chamber connected at one end to said channel and at the opposite end to a suitable source for delivering the flushing liquid under pressure.

3. In a drilling apparatus including a roller bit having an inner chamber filled with a non-compressible flushing liquid, at least one pivot and a cutting roller supported for rotation on said pivot on at least a pair of bearings, a system for lubricating the bearings comprising at least one channel in the roller bit connecting the fluid chamber and a bearing cavity between the pivot and cutting roller and discharge ports in the wall of said cutting roller between said bearings at circumferentially spaced locations permitting discharge of a portion of the flushing liquid to the environment around the cutting roller after passage through one of said bearings.

4. In a drilling apparatus including a roller bit having an inner chamber filled with a non-compressible flushing liquid, at least one pivot and a cutting roller having a tip supported on said pivot by bearing means including an inner friction bearing insert adjacent the tip of the cutting roller, an outer roller bearing spaced axially from the bearing insert and an intermediate ball bearing between the bearing insert and roller bearing, an annular gap between the outer axial end face of the cutting roller and an opposing confronting face of the roller bit spaced from said cutting roller end face, a system for lubricating the bearing comprising at least one channel in the roller bit connecting the fluid chamber and a space between the pivot and cutting roller adjacent the tip thereof and at least one discharge opening in the wall of the cutting roller between said bearing insert and ball bearing permitting discharge of some of the flushing liquid to the environment around the cutting roller after passage through said bearing insert, and the remainder of said flushing liquid discharges through said gap after passage through said ball and roller bearings.

* * * * *